US012258914B2

(12) United States Patent
Zink et al.

(10) Patent No.: US 12,258,914 B2
(45) Date of Patent: Mar. 25, 2025

(54) METHOD FOR OPERATING AN INTERNAL COMBUSTION ENGINE, IN PARTICULAR OF A MOTOR VEHICLE

(71) Applicant: Daimler Truck AG, Leinfelden-Echterdingen (DE)

(72) Inventors: Alexander Zink, Esslingen (DE); Marc Oliver Wagner, Esslingen am Neckar (DE); Thomas Schuhmacher, Oberhausen-Rheinhausen (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 18/565,743

(22) PCT Filed: May 31, 2022

(86) PCT No.: PCT/EP2022/064735
§ 371 (c)(1),
(2) Date: Nov. 30, 2023

(87) PCT Pub. No.: WO2022/253820
PCT Pub. Date: Dec. 8, 2022

(65) Prior Publication Data

US 2024/0254931 A1 Aug. 1, 2024

(30) Foreign Application Priority Data

Jun. 2, 2021 (DE) ..................... 10 2021 002 865.1

(51) Int. Cl.
*F02D 13/02* (2006.01)
*F01L 1/04* (2006.01)
*F01L 1/047* (2006.01)

(52) U.S. Cl.
CPC .......... *F02D 13/0276* (2013.01); *F01L 1/047* (2013.01)

(58) Field of Classification Search
CPC ............. F02D 13/0203; F02D 13/0219; F02D 13/0249; F02D 13/0273; F02D 13/04;
(Continued)

(56) References Cited

U.S. PATENT DOCUMENTS 4,981,119 A * 1/1991 Neitz ..................... F02M 26/01
123/321
11,619,181 B2 4/2023 Dahl et al.
(Continued)

FOREIGN PATENT DOCUMENTS

DE 10 2008 064 264 A1 6/2010
DE 10 2013 106 510 A1 6/2014
(Continued)

OTHER PUBLICATIONS

International Search Report (PCT/ISA/210) issued in PCT Application No. PCT/EP2022/064735 dated Sep. 13, 2022 (3 pages).
Weber, et al., "Variable Ventilsteuerung als Ergaenzung zur Hybrid-Abgas-rueckfuehrung beim Dieselmotor", *MTZ—Motortechnische Zeitschrift, Springer*, vol. 70, No. 4, Apr. 2009, pp. 308-315, XP001521561 (8 pages).

*Primary Examiner* — Logan M Kraft
*Assistant Examiner* — Johnny H Hoang
(74) *Attorney, Agent, or Firm* — Crowell & Moring LLP

(57) ABSTRACT

A method for operating an internal combustion engine. The internal combustion engine has multiple cylinders and the cylinders are assigned a respective exhaust valve and intake valve. The internal combustion engine has a crankshaft, an intake camshaft, and an exhaust camshaft. Initially, the internal combustion engine is operated in a first operating state. A second operating state of the internal combustion engine is set by the intake camshaft being adjusted late relative to the crankshaft in comparison to the first operating state and the exhaust camshaft being adjusted early relative to the crankshaft in comparison to the first operating state. To set the second operating state, the intake camshaft is adjusted late by a first value which is in a range from 50-120
(Continued)

crank angle degrees and the exhaust camshaft is adjusted early by a second value which is in a range of 1-35 crank angle degrees.

4 Claims, 1 Drawing Sheet

(58) Field of Classification Search
CPC ............. F02D 41/0005; F02D 41/0007; F02D 41/061; F02D 41/065; F02D 41/047; F02D 41/126; F02D 41/38; F02D 41/40; Y02T 10/12; F01L 1/053; F01L 1/344; F01L 13/0249; F01L 13/06; F01L 13/065; F01L 2001/34496; F01L 2820/01; F01L 2820/04; F01L 2820/042; F01L 2250/04
USPC ........................................... 427/282; 118/504
See application file for complete search history.

(56) References Cited

U.S. PATENT DOCUMENTS

| | | | | |
|---|---|---|---|---|
| 2010/0077989 | A1* | 4/2010 | Yamakawa | F02D 13/0265 123/436 |
| 2013/0291830 | A1* | 11/2013 | Doering | B60W 20/40 123/350 |
| 2017/0002702 | A1* | 1/2017 | Gunnarsson | F02B 75/02 |
| 2018/0274456 | A1* | 9/2018 | Gunnarsson | F01L 1/053 |

FOREIGN PATENT DOCUMENTS

| | | | |
|---|---|---|---|
| DE | 10 2021 118 125 | A1 | 4/2022 |
| EP | 2 169 198 | A1 | 3/2010 |
| EP | 3 077 647 | B1 | 10/2016 |
| WO | WO 2022/089903 | A1 | 5/2022 |

* cited by examiner

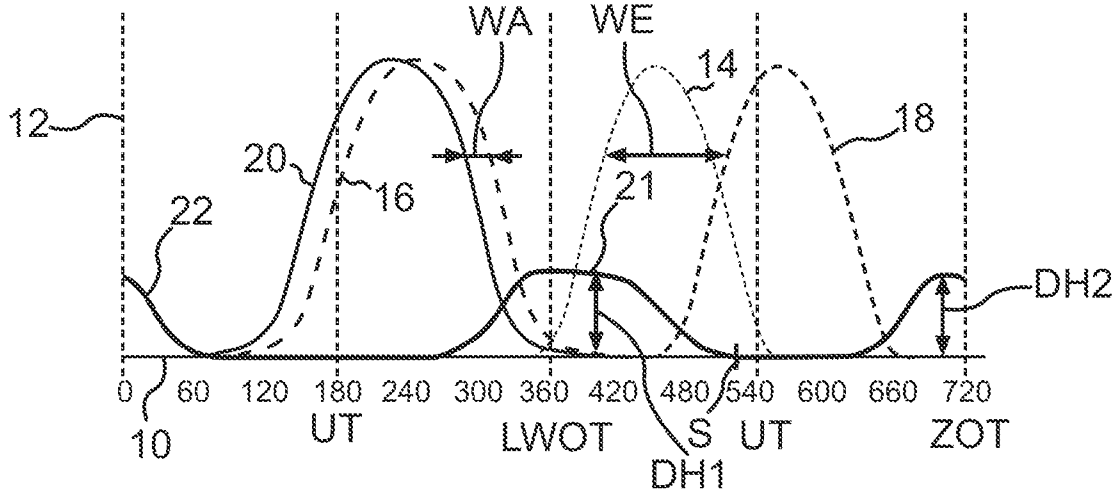
WA
WE
14
12
18
20
16
22
21
DH2
0
60
120
180
240
300
360
420
480
540
600
660
720
10
UT
LWOT
S
UT
ZOT
DH1

METHOD FOR OPERATING AN INTERNAL COMBUSTION ENGINE, IN PARTICULAR OF A MOTOR VEHICLE

BACKGROUND AND SUMMARY OF THE INVENTION

The invention relates to a method for operating an internal combustion engine, in particular of a motor vehicle.

Such a method for operating an internal combustion engine, in particular of a motor vehicle, can, for example, already been gleaned as known from EP 3 077 647 B1. In this case, the internal combustion engine has multiple cylinders. The respective cylinders are each assigned at least one exhaust valve and at least one intake valve. Additionally, the internal combustion engine has a crankshaft, via which the internal combustion engine can provide torques, in particular for driving the motor vehicle. Furthermore, the internal combustion engine has at least one intake camshaft, drivable by the crankshaft, to actuate the intake valves and at least one exhaust camshaft, drivable by the crankshaft, to actuate the exhaust valves. During the method, the internal combustion engine is initially operated in a first operating state. In addition, a second operating state of the internal combustion engine, different from the first operating state, is set so that, for example, the internal combustion engine is not operated in the first operating state anymore, but in the second operating state. The second operating state is set by adjusting, in particular rotating, the intake camshaft late relative to the crankshaft in comparison to the first operating state, and adjusting the at least one exhaust camshaft early relative to the crankshaft in comparison to the first operating state.

Furthermore, DE 10 2008 064 264 A1 discloses an exhaust tract with a valve element arranged in the region of an exhaust gas recirculation line.

The object of the present invention is to further develop a method of the aforementioned type in such a way that a particularly advantageous operation of the internal combustion engine can be achieved.

In order to further develop a method of the type specified herein in such a way that a particularly advantageous operation of the internal combustion engine can be achieved, it is provided according to the invention that to set the second operating state, meaning to switch the internal combustion engine from the first operating state into the second operating state, the at least one intake camshaft is adjusted late by a first value which is in a range from 50 crank angle degrees to 120 crank angle degrees. Furthermore, to set the second operating state, the at least one exhaust camshaft is adjusted early by a second value, in comparison to the first operating state, which is in a range of 1 crank angle degrees to 35 crank angle degrees.

The adjustment of the at least one intake camshaft or the at least one exhaust camshaft takes place for example by means of a camshaft adjuster, also known as a phase adjuster, by means of which the at least one intake camshaft or the at least one exhaust camshaft is rotated or can be rotated independent from each other relative to the crankshaft of the internal combustion engine. By adjusting the at least one intake camshaft to late, the intake valves of the cylinders are actuated, meaning opened, in the second operating state, 50 to 120 crank angle degrees later in comparison to the first operating state, by means of the at least one intake camshaft. By adjusting the at least one exhaust camshaft to early, the exhaust valves of the cylinders are actuated, meaning opened, in the second operating state 1 to 35 crank angle degrees earlier in comparison to the first operating state, by means of the at least one exhaust camshaft. Due to the method according to the invention, a particularly high exhaust temperature of the internal combustion engine at very low or rather minimal drag torque can be achieved. The adjustment or rather the rotation of the at least one intake camshaft to late leads to heated gas from an intake manifold of the internal combustion engine being introduced, in particular sucked, by at least one of the opened intake valves of the respective cylinder, also referred to as engine cylinder, into the cylinder, at least one intake valve of which is open.

Via the intake manifold, the gas, which can comprise ambient air or a mixture of ambient air and recirculated exhaust gas, can flow over the respective intake valves into the respective cylinder. Because the at least one intake camshaft is adjusted to late, gas already sucked into the respective cylinders is at least partially compressed during an upwards movement of a piston arranged in the respective cylinder so that translationally moveable, in particular during a compression phase of the piston, and therefore heated and at least partially pushed back into the intake manifold when it is heated.

Each piston is hinged for example by a respective connecting rod with the crankshaft, so that the translational movements of the respective piston are transformed into a rotational movement of the crankshaft. Within each working cycle of the internal combustion engine, the respective piston moves exactly two times into its top dead center and exactly two times into its bottom dead center, wherein each working cycle comprises, specifically exactly, 720 crank angle degrees, meaning two complete revolutions of the crankshaft. Within the working cycle, the piston comes, specifically exactly, two times into its top dead center, so that the top dead center occurs two times. A first of the occurrences of the top dead center is also referred to as a top ignition dead center (ZOT), as, for example, during a fired operation of the internal combustion engine in the area of the top ignition dead center, a fuel-air mixture located in the respective cylinder is ignited and as a result burnt. The second occurrence of the top dead center is also referred to as a top charge exchange dead center or as a top gas exchange dead center (LWOT), as, for example, during the fired operation in the area of the top charge exchange dead center, an exhaust gas of the internal combustion engine resulting from the combustion of the fuel-air mixture is ejected from the respective cylinder by means of the respective piston by the respective exhaust valves and new gas is sucked into the respective cylinder from the intake manifold by the respective intake valves.

The internal combustion engine is therefore for example formed as a four-stroke engine, so that the respective working cycle has exactly four strokes. In the fired operation, a first of the strokes is known as an induction stroke or an intake stroke, in which, in particular by means of the piston, gas, in particular from the intake manifold, is introduced into the cylinder, in particular sucked in, or rather during the induction stroke gas can flow from the intake manifold into the cylinder, and during the intake stroke the piston moves from its top dead center, in particular from the top charge exchange dead center, into the bottom dead center. A second stroke which follows the first stroke is known as a compression stroke, which is also described as a compression phase. During the compression stroke the piston moves from the bottom dead center to the top dead center, in particular to the top ignition dead center, wherein the gas previously introduced into the cylinder is compressed. A third stroke which follows the second stroke is also known as a power stroke and during the power stroke, the piston is driven by an expansion of the fuel-air mixture resulting from the ignition and combustion of the fuel-air mixture and therefore moves from the top dead center, in particular from the top ignition dead center, to the bottom dead center. As a result, the crankshaft is driven. The fourth stroke which follows the third stroke is also known as an exhaust stroke or ejection phase, as during the fourth stroke, the exhaust gas is ejected from the cylinder by means of the piston. The first operating state corresponds for example to the fired operation or rather the fired operation of the internal combustion engine can occur during the first operating state. During the fired operation, combustion processes take place in the respective cylinder, during which respective fuel-air mixtures are ignited and burnt. Furthermore, it is conceivable that in the first operating state the internal combustion engine is operated in drag mode.

In the second operating state the internal combustion engine is dragged, whereby only a drag torque occurs, and fuel is not introduced into the internal combustion engine and burnt. Furthermore, it is conceivable that in the second operating state, the internal combustion engine is operated in a fired mode, wherein the internal combustion engine is operated at a low load, so that the internal combustion engine produces only a very small torque.

As previously mentioned, the adjustment, in particular rotation, of the at least one intake camshaft to late leads to gas being sucked from the intake manifold into at least one of the cylinders relatively late in comparison to the first operating state by at least one of the opened intake valves. Because the at least intake camshaft is adjusted to late, in the second operating state the intake valve opens relatively late during the induction stroke and only closes during the compression stroke, so that gas already introduced into the cylinder is at least partially compressed during the movement of the piston from its bottom dead center to its top ignition dead center, whereby the gas in the cylinder is pushed back into the intake manifold, at least partially, heated. Advantageously, this gas, which is pre-heated and pushed back into the intake manifold, is introduced during the induction stroke by at least one of the other cylinders, so that the other cylinder does not cool down or cools down less quickly during the second operating state, whereby the gas is pushed into an exhaust tract after the opening of the exhaust valves of the at least one other cylinder, at least partially, with a higher temperature.

Due to the later opening of the intake valves in the second operating state compared with the first operating state, a minimum cylinder pressure, meaning the minimum pressure prevailing in the cylinder, is reduced. In order to avoid undesired undercuts of the minimum cylinder pressure, additionally the at least one exhaust camshaft is adjusted, in particular rotated, to early, for example by up to 35 crank angle degrees. Therefore the respective exhaust valves open and close earlier in the second operating state compared with the first operating state, so that the exhaust valves are closed until the respective piston reaches the top charge exchange dead center from the bottom dead center, whereby some of the gas in the respective cylinder is retained and a certain pressure in the cylinder is maintained. As is well known, the intake valves and the exhaust valves, which are also simply known as gas exchange valves or valves in summary, move according to respective valve lift curves. With increasing displacement of the valve lift curves away from the top charge exchange dead center, also known as top gas exchange dead center, the mass flow through the internal combustion engine, which is simply also known as the combustion engine or engine, reduces concurrently with the increase of the exhaust gas temperature. Therefore, it keeps the cooling-down of the exhaust gas system low or even prevents it, simultaneously with minimal gas exchange work.

The exhaust gas system is for example an exhaust gas after-treatment system, which is also known as an exhaust gas after-treatment device or exhaust-gas after-treatment assembly, and is arranged in an exhaust tract through which the exhaust gas of the internal combustion can flow. In other words, by the method according to the invention, a particularly high exhaust gas temperature can be achieved or rather maintained with minimal drag torque, so that the exhaust gas after-treatment device does not cool down and maintains its functionality.

With the method according to the invention, therefore, at least a particularly advantageous thermal management can be achieved. The invention is based on in particular the knowledge that in conventional methods during overrun operation, until now a clear increase of the exhaust gas temperature can only be achieved with considerable increase of the drag torque and/or an increase of the fuel consumption. Components necessary for this, such as for example an exhaust gas flap, a throttle valve and/or a burner, lead to a high number of parts and therefore to a high weight and to a high costs and are typically only available for just one engine function, which is sufficient to increase the exhaust gas temperature. With the help of the method according to the invention it is possible, by an intake side and an exhaust side camshaft adjustment, to achieve particularly advantageous thermal management during the drag mode. Furthermore, the method creates the basis to perform an advantageous low load operation and therefore a fired operation with low torques, in which, compared to the low load operation with low exhaust gas temperatures during the first operating state, the exhaust gas temperatures are able to be increased during the second operating state, so that the exhaust gas after-treatment device still does not cool down and maintains its functionality. Furthermore, by the method according to the invention, the number of parts, the weight and the cost of the internal combustion engine can be kept at a particularly low level.

It has been shown to be particularly advantageous if, during the second operating state, in the case of at least one of the cylinders, a decompression mode of at least one of the cylinders is set. This is to be understood as meaning that the at least one cylinder is operated in the manner of a decompression brake. In the second operating state, as described above, the mass flow rate of gas and exhaust gas through the internal combustion engine is very low, so that an engine braking effect of the decompression brake type only occurs very little in the second operating state, whereby an impairment of the drag mode or the low load mode does not occur or occurs only to a minor extent. Such a decompression operation is sufficiently known. During the decompression operation of the at least one cylinder it is provided that a respective gas is compressed within the respective working cycle in the at least one and then decompressed in the manner of a decompression brake, so that the gas containing compression energy contained in the compressed gas is not or only marginally used for powering the piston arranged in the at least one cylinder, meaning for the movement of the piston arranged in the at least one cylinder to its bottom dead center. Therefore, for example the compressed gas is drained from the at least one cylinder in the area of the charge exchange dead center and/or the ignition dead center. This can happen by means of an exhaust device provided in addition to the gas exchange valves of the at least one cylinder, which for example is formed as a decompression valve. Furthermore, it is conceivable to release the compressed gas from the at least one cylinder in the area of a top dead center by a decompression stroke of at least one of the gas exchange valves of the at least one cylinder. Preferably, at least one exhaust valve performs or rather the exhaust valves of the at least one cylinder perform at least one decompression stroke.

By setting the decompression operation of the at least one cylinder, in particular in combination with the adjustment of the intake camshaft to late and in combination with the adjustment of the exhaust camshaft to early, a particularly high heat flow into the exhaust gas be achieved. The compressed gas is discharged out of the at least one cylinder for example by at least one decompression stroke, whereby heated and compressed exhaust gas is discharged into the exhaust gas after-treatment device. Due to the activation of the decompression stroke, by varying the at least one intake camshaft in a range from for example +50 crank angle degrees up to +120 crank angle degrees and by varying the at least one exhaust camshaft for example in a range from 0 or 1 degree crank angle to −35 crank angle degrees, the exhaust gas temperature and the heat input can be varied over a very wide range with minimal gas exchange work. Therefore, the exhaust gas temperature increases as the exhaust camshaft is adjusted to early, reinforced by the at least one activated decompression stroke. Therefore, an early ejection into an exhaust duct following the respective exhaust valve takes place during the stroke, during which the piston moves into its top dead center after the decompression. The heat input into the exhaust gas system reduces with the increasing adjustment of the intake camshaft to late with a reduced mass flow rate.

Furthermore, an expansion of the method to the low load range of the internal combustion engine is conceivable. For this purpose, the at least one intake camshaft as described is adjusted to late, and the at least one exhaust camshaft as described is adjusted to early, wherein the activation of the decompression stroke takes place in the at least one cylinder, and a decompression operation is not set in at least one of the other cylinders. For example, fuel is introduced into at least one of the other cylinders, in particular injected, whereby the decompression operation is not set and therefore for example the decompression stroke is not activated. In addition to the introduction of fuel, advantageously the exhaust gas of the at least one other cylinder with this fuel injection is at least partially recirculated to this at least one other cylinder. Advantageously, all the exhaust gas of the at least other cylinder with fuel injection is recirculated to the at least one other cylinder.

An advantage here is a combination with a so-called shifted EGR valve. Therefore at least a part of the exhaust gas of a bank of cylinders is recirculated into an intake tract of the internal combustion engine. This bank of cylinders comprises multiple and preferably not all of the cylinders of the internal combustion engine. Preferably, all the exhaust gas is recirculated into the bank of cylinders in which the decompression operation is omitted but the fuel is injected. In particular, all the exhaust gas is only recirculated into the bank of cylinders in which the decompression operation is omitted but the fuel is injected. The shifted EGR valve is known from the aforementioned DE 10 2008 064 264 A1 and is not further explained.

In particular the following advantages can be achieved by the method according to the invention:

- significant increase of the exhaust gas temperature at minimal drag torque
- heat flow into the exhaust gas through simple connection of the decompression stroke or rather for the implementation of decompression brake operation can be increased
- a combination of intake phase adjustments and exhaust phase adjustments and setting of the decompression brake operation is possible; therefore, a high variability of the thermal management can be achieved, as the temperature can be maintained at minimal drag torque, or a high energy flow can be introduced into the exhaust gas
- avoidance of excessively low minimum cylinder pressures
- advantageous noise behaviour, as acoustic disadvantages can be minimized.

Further advantages, features and details of the invention arise from the description of a preferred exemplary embodiment below, as well as with the aid of the drawing. The features and feature combinations cited in the description above and below in the description of the FIGURE and/or shown in the single FIGURE alone can be used not only in each specified combination, but rather also in other combinations or individually, without exceeding the scope of the invention.

BRIEF DESCRIPTION OF THE DRAWING

The drawing shows in the single FIGURE a diagram to demonstrate a method according to the invention of operating an internal combustion engine, in particular a motor vehicle.

DETAILED DESCRIPTION OF THE DRAWING

The single FIGURE shows a diagram on the basis of which a method for operation of an internal combustion engine of a motor vehicle is illustrated below.

The motor vehicle is for example formed as an automobile, in particular as a commercial vehicle, and can be driven by means of the internal combustion engine, in particular during fired operation. The internal combustion engine is formed as a reciprocating piston engine and has at least one cylinder and at least one piston, which is translationally moveable within the cylinder. In particular, the internal combustion engine has multiple cylinders in which combustion processes take place during the fired operation of the internal combustion engine. The first of the cylinders form for example a first cylinder group, with the second of the cylinders forming a second cylinder group. Therefore, for example the first cylinder group comprises at least one cylinder of the first cylinders and the second cylinder group comprises at least one other cylinder of the second cylinders. The respective cylinder group is for example also referred to as a bank of cylinders. In particular, the internal combustion engine can be formed as a V engine, so that the cylinders or rather the bank of cylinders can be arranged in a V form relative to one another. Furthermore, the internal combustion engine can be formed as an in-line engine, so that the bank of cylinders can be arranged adjacent to one another.

In the respective cylinder, the respective piston is accommodated so that it can move translationally, wherein the piston can be moved between a top dead center and a bottom dead center. The internal combustion engine has furthermore an output shaft formed as a crankshaft, by which the internal combustion engine can provide torque moments for driving the motor vehicle. Each piston is hinged for example by a respective connecting rod with the crankshaft, so that the translational movements of the pistons are transformed into a rotational movement of the crankshaft. The cylinders with their respective pistons and a cylinder head enclose respectively a combustion chamber, in which the combustion processes take place.

Each work cycle of the internal combustion engine formed as a four-stroke engine comprises exactly two full revolutions of the crankshaft and therefore exactly 720 crank angle degrees. During the revolutions, the crankshaft arrives in the respective, different rotational positions or rotational angles, wherein the rotational positions or rather the rotational angles are also referred to as crank angle degrees. Within the respective work cycle, the respective piston moves exactly two times into its top dead center and exactly two times into its bottom dead center UT, so that during the respective work cycle the top dead center occurs exactly two times. The first occurrence of the top dead center is for example known as a top charge exchange dead center LWOT. A second of the occurrences is for example a top ignition dead center ZOT.

As the internal combustion engine is formed as a four-stroke engine, the respective work cycle comprises exactly four strokes. During the fired operation for example, a first of the strokes is an intake stroke, also referred to as induction stroke, in which the respective piston moves from the charge exchange dead center LWOT into its respective bottom dead center UT and at least ambient air is introduced into the cylinders via intake valves and therefore a gas, also referred to as a cylinder charge, is introduced into the cylinders from an intake tract via the intake valves. The first stroke is followed by a second of the strokes. The second stroke is a compression stroke, also described as a compression phase, in which the respective piston moves from the bottom dead center UT into the top ignition dead center ZOT. Therefore, during the fired operation, the cylinder charge previously introduced into the respective cylinder is compressed by means of the piston. A third stroke that follows the second stroke is a working stroke, in which the respective piston is driven and therefore moved from its top dead center ZOT into its bottom dead center UT. At the top ignition dead center ZOT, a fuel-air mixture is ignited and burned. Therefore, the respective piston is driven as described. The fourth stroke following the third stroke is described as an ejection stroke, discharge stroke or also as a discharge phase, as during the fourth stroke the burnt fuel-air mixture or rather exhaust gas is ejected by means of the respective piston via the exhaust valves from the respective cylinder into an exhaust tract.

The internal combustion engine comprises furthermore at least one intake valve or more intake valves per cylinder, in particular exactly two, whereby the cylinder charge is introduced into the respective cylinder or rather can flow in. If the internal combustion engine is formed as a charged internal combustion engine, the cylinder charge is introduced into the respective cylinder via the intake valves for example by means of a compressor of an exhaust gas turbocharger. In addition to the ambient air for example, additional recirculated exhaust gas can be contained in the cylinder charge, wherein typically by means of a HP-EGR (high pressure exhaust gas recirculation) downstream of the compressor, the recirculated exhaust gas is mixed with the ambient air compressed by means of the compressor and/or by means of a LP-EGR (low pressure exhaust gas recirculation) upstream of the compressor, it is mixed with the introduced ambient air. In particular, the cylinder charge from the intake manifold can flow into the respective cylinder via intake channels of an intake tract of the internal combustion engine via the intake valves, especially when the respective intake valves are opened. A separate intake manifold can be assigned to each bank of cylinders, so that the ambient air compressed by the compressor and any recirculated exhaust gas is driven into the respective intake manifold of the bank of cylinders and supplied to the respective bank of cylinders. The internal combustion engine has also at least one intake camshaft that can be driven by the crankshaft with at least one intake cam for actuating the at least one intake valve. Typical internal combustion engines are designed as a V engines or in-line engines. An internal combustion engine designed as a V engine can have one intake camshaft for every bank of cylinders, respectively, by means of which the respective intake valve, in particular the respective bank of cylinders, can be operated and can thus be opened. V engines with only one intake camshaft for the cylinder bank are also conceivable or designed. Typically, an internal combustion engine, which is formed as an in-line engine, only has one intake camshaft for both cylinder banks.

Also, for every cylinder at least one exhaust valve of the internal combustion engine is provided, wherein typically multiple exhaust valves and in this case, for example, exactly two exhaust valves are provided per cylinder. A cylinder charge like for example the previously mentioned exhaust gas can flow out of the cylinder via the respective exhaust valve and for example into an exhaust gas manifold, also referred to as an exhaust manifold, and therefore flow into the exhaust tract or rather stream onto an exhaust side of the internal combustion engine. For every cylinder bank a separate exhaust gas manifold can be provided. Therefore, initially the exhaust gas of the cylinder of the respective cylinder bank is collected in its own respective exhaust gas manifold, before the exhaust gas flows from the respective exhaust gas manifold of the respective cylinder bank into the exhaust tract. An exhaust gas recirculation valve of the HP-EGR can be provided on one of the exhaust gas manifolds of a cylinder bank. The exhaust gas of the cylinders of a cylinder bank can be recycled from the exhaust gas manifold into the intake tract due to the exhaust gas recirculation valve. The recirculated gas can be supplied into the present cylinder banks or preferably the cylinder bank and therefore to the cylinders, the exhaust gas of which is recirculated.

The internal combustion engine has at least one exhaust camshaft, drivable by the crankshaft, with at least one exhaust cam of the at least one exhaust valve of a cylinder and at least one decompression lift to actuate at least one exhaust valve of a cylinder. In particular, the internal combustion engine has an exhaust camshaft, in particular for every cylinder bank of a V engine, by means of which the respective exhaust valves, in particular of the respective cylinder bank, can be actuated and therefore can be opened. V engines with only one exhaust camshaft for the cylinder banks are also conceivable or designed. Typically, an internal combustion engine, which is formed as an in-line engine, only has one exhaust camshaft for both cylinder banks.

The at least one intake camshaft and the at least one exhaust camshaft are also collectively referred to as camshafts, which can be driven by the crankshaft. Furthermore, the intake valve and the exhaust valve are collectively referred to as gas exchange valves. An exhaust gas after-treatment device also referred to as an exhaust gas system and which exhaust gas can flow through is arranged in the exhaust tract. By means of the exhaust gas system, the exhaust gas can be after-treated.

During each working cycle the crankshaft arrives at different rotational positions or rotational angles, which are also described as crank angles or crank angle degrees. Therefore, the diagram shown in the FIGURE has an abscissa 10, on which the crank angle degrees are plotted. The respective gas exchange valve is translationally moveable and therefore carries out a respective stroke within the respective work cycle, which stroke is plotted on the ordinate 12 of the diagram.

In the scope of the method, the internal combustion engine for example is initially operated in a first operating state, in or during which the internal combustion engine for example is in its fired mode or in a drag mode. In the first operating state or during the first operating state, the intake valves are actuated or moved according to the valve lift curve 14 shown in the FIGURE by means of the at least one intake camshaft. In the exemplary embodiment illustrated in the FIGURE, exactly two intake valves and exactly two exhaust valves are assigned to the respective cylinder, wherein one of the exhaust valves is also referred to as first exhaust valve and the other exhaust valve is also referred to as second exhaust valve. For example, in the first operating state, both the first exhaust valve and the second exhaust valve are actuated or moved according to a valve lift curve 16 shown in the FIGURE. Therefore, for example the valve lift curves 14 and 16 illustrate the movements or rather actuations of the gas exchange valves during the fired operation or rather in the first operating state.

In the method, the internal combustion engine is switched from the first operating state into the second operating state, thus the second operating state is set. The second operating state is therefore set by adjusting the intake camshaft to late in comparison to the first operating state relative to the crankshaft.

In order therefore to achieve a particularly advantageous operation of the internal combustion engine, the intake camshaft is adjusted to late by a first value WE, wherein the first value is in a range of 50 crank angle degrees to 120 crank angle degrees. Therefore, the intake valves are moved or actuated in the second operating state according to the valve lift curve 18. Additionally, to set the second operating state, the exhaust valve is adjusted to early by a second value WA, relative to the crankshaft, in comparison to the first operating state, wherein the second value is in a range from 1 crank angle degrees to 35 crank angle degrees. Therefore, the exhaust valves are moved or actuated in the second operating state according to the valve lift curve 20.

The second operating state is preferably an operation, also described as a thermal management operation or thermal management, in which the internal combustion engine is for example in its unfired state or a low load operation. Due to the adjustment of the camshaft however, a sufficiently high exhaust gas temperature can be achieved, so that a particularly advantageous temperature of the exhaust gas system can be realized, or an undesired low temperature of the exhaust gas system can be avoided.

Since the at least one intake camshaft is adjusted to late for the setting of the second operating state, the, in particular all, intake valves assigned to each cylinder are moved or actuated during the second operating state, according to the valve lift curve 18 shown in the FIGURE. The at least one intake camshaft is adjusted or rotated with a known phase adjuster with respect to the crankshaft. Certainly, the intake camshaft can also be adjusted in the first operating state with the phase adjuster for the at least one intake camshaft.

In the second operating state both exhaust valves of the respective cylinder are actuated by means of the respective exhaust cam, so that in the second operating state both exhaust valves are actuated or moved according to the valve lift curve 20 shown in the FIGURE. The valve lift curve 20 corresponds to the valve lifting cam 16 with the single difference that the valve lift curve 20 is adjusted or shifted earlier compared to the valve lift curve 16. This results from the adjustment to early of the at least one exhaust camshaft by means of another phase adjuster.

Furthermore, it is preferably provided that to set the second operating state, in the case of at least one of the cylinders or for at least one of the cylinders, a decompression operation of the at least one cylinder is set so that in the second operating state the at least one cylinder is operated in decompression operation and therefore in the manner of a decompression brake. In this case, a first cylinder charge is compressed in the cylinder inside the respective working cycle of the internal combustion engine and is decompressed afterwards by means of a first decompression stroke DH1 of the exhaust valves in the manner of a decompression brake.

For the internal combustion engine to be able to achieve a particularly advantageous operation, in particular a particularly advantageous thermal management operation, it is provided that in the second operating state the exhaust valve achieves its closed position S, indirectly or directly following the first decompression stroke DH1 within each work cycle at 40 crank angle degrees to 165 crank angle degrees after the top charge exchange dead center LWOT of the piston. In other words, the crankshaft is located at 40 crank angle degrees to 165 crank angle degrees, preferably at a value greater than 80 crank angle degrees to at most 165 crank angle degrees, as represented in the FIGURE, after the top charge exchange dead center LWOT of the piston when the first exhaust valve reaches its closed position S indirectly following the first decompression stroke DH1. The closed position S refers to the state of the exhaust valves of the respective cylinder when the first exhaust valves are not opened, i.e., the exhaust valve lift is zero or there is zero lift.

For the advantageous setting of the second operating state, for example an actuating element assigned to the first exhaust valve is moved from the first position into a different second position, so that the exhaust valves are actuated by means of the exhaust cam assigned to the exhaust valves and therefore additionally at least one exhaust valve of a respective cylinder is actuated by means of a decompression lift different from the exhaust cam with the decompression stroke DH1. The decompression lift can, as is known, be designed as additional decompression cams next to the exhaust cams or as additional decompression lifts on the exhaust cam. Therefore, an actuation of the first exhaust valve and simultaneously of the second exhaust valve of each cylinder caused by the exhaust cams is carried out according to the valve lift curve 20 in the second operating state. Additionally, an actuation for example of the first exhaust valve by the decompression lifts causes the first exhaust valve to be actuated or moved in the second operating state according to a valve lift curve 21 and/or a valve lift curve 22. Thus, the first exhaust valve performs the decompression stroke DH1 according to the valve lift curve 21 as the first decompression stroke DH1 as well as a second decompression stroke DH2, according to the valve lift curve 22 within each work cycle. This is explained in more detail below. The movement of the actuating element from the first position to the second position is also referred to as an activation of the decompression strokes DH1 and DH2. The activated decompression strokes DH1 and DH2 are firmly linked by their position on the crank circle with the exhaust stroke. Due to the previously described link, the exhaust stroke 20 and the respective decompression stroke DH1 or decompression stroke DH2 are simultaneously shifted, for example by the other phase adjuster. Certainly, the exhaust camshaft can be adjusted in the first operating state with the other phase adjuster for the at least one exhaust camshaft. It is also conceivable that the second exhaust valve also along with the first exhaust valve is actuated in the second operating state according to the valve lift curve 21 and valve lift curve 22, so that the second exhaust valve of a cylinder also executes the decompression strokes DH1 and DH2. Furthermore, it is conceivable that the first exhaust valve only executes one of the two decompression strokes DH1, DH2, whilst the second exhaust valve executes the other of the two decompression strokes DH1, DH2 or does not execute any of the decompression strokes DH1, DH2.

Preferably, in the second operating state it is provided in a low load operation that the decompression brake operation of the cylinders is only set for one of the cylinder banks, whilst a setting of a decompression brake operation is omitted for the cylinders of the other cylinder groups. Preferably, this is combined with such an exhaust gas recirculation that the entire exhaust gas mass flow of one of the cylinder banks is recirculated, in particular into an intake tract of the internal combustion engine. Preferably, the entire exhaust gas mass flow of the cylinder bank is recirculated, whereby the setting of the decompression brake operation or the activation of the brake cam is omitted. The second operating state is a particularly advantageous thermal management operation, as sufficiently high exhaust gas temperatures can be achieved.

LIST OF REFERENCE CHARACTERS

10 Abscissa
12 Ordinate
14 Valve lift curve
16 Valve lift curve
18 Valve lift curve
20 Valve lift curve
21 Decompression lift
22 Decompression lift
DH1 First decompression stroke
DH2 Second decompression stroke
WE First value
WA Second value
S Closed position
UT Bottom dead center
ZOT Top dead center
LWOT Top charge exchange dead center

The invention claimed is:

1. A method for operating an internal combustion engine, the method comprising:

operating the internal combustion engine in a first operating state, wherein the internal combustion engine has: a plurality of cylinders each assigned a respective exhaust valve and intake valve, a crankshaft via which the internal combustion engine provides torque, an intake camshaft driven by the crankshaft to actuate the respective intake valves, and an exhaust camshaft driven by the crankshaft to actuate the respective exhaust valves; and setting a second operating state different from the first operating state by:

adjusting the intake camshaft late by a first value that is in a range for 50 crank angle degrees to 120 crank angle degrees compared to the intake crankshaft in the first operating state, adjusting the exhaust camshaft early by a second value that is in a range from 1 crank angle degree to 35 crank angle degrees compared to the exhaust camshaft in the first operating state, and operating at least one cylinder in a decompression operation during which the at least one cylinder is operated in an unfired state and at least one other cylinder is operated in a fired state, and an exhaust gas from the at least one other cylinder is at least partially recirculated to the at least one other cylinder.

2. The method of claim 1, wherein during the decompression operation, a first decompression stroke is carried out in a top gas exchange dead center.

3. The method according to of claim 2, wherein during the decompression operation, a second decompression stroke (DH2) is carried out in a top ignition dead center (ZOT).

4. The method of claim 1, wherein an entire exhaust gas of the at least one other cylinder is recirculated to the at least one other cylinder.

* * * * *